US012516733B2

(12) United States Patent
Bhadane et al.

(10) Patent No.: US 12,516,733 B2
(45) Date of Patent: Jan. 6, 2026

(54) EXTRUSION MOLDED THERMOPLASTIC VULCANIZATE GASKETS AND METHODS OF MAKING SUCH GASKETS

(71) Applicant: Celanese International Corporation, Irving, TX (US)

(72) Inventors: Prashant A. Bhadane, Houston, TX (US); Milind B. Joshi, Karnataka (IN); Jeffrey M. Smith, Hinckley, OH (US); Brian S. Potempa, Freeport, IL (US); Michael M. Potempa, Freeport, IL (US)

(73) Assignee: Celanese International Corporation, Irving, TX (US)

( * ) Notice: Subject to any disclaimer, the term of this patent is extended or adjusted under 35 U.S.C. 154(b) by 0 days.

(21) Appl. No.: 18/256,939

(22) PCT Filed: Sep. 23, 2021

(86) PCT No.: PCT/US2021/051713
§ 371 (c)(1),
(2) Date: Jun. 12, 2023

(87) PCT Pub. No.: WO2022/132268
PCT Pub. Date: Jun. 23, 2022

(65) Prior Publication Data
US 2024/0035572 A1 Feb. 1, 2024

Related U.S. Application Data

(60) Provisional application No. 63/126,191, filed on Dec. 16, 2020.

(51) Int. Cl.
*F16J 15/10* (2006.01)
*B29C 48/00* (2019.01)
*B29L 31/26* (2006.01)

(52) U.S. Cl.
CPC .......... *F16J 15/102* (2013.01); *F16J 15/104* (2013.01); *F16J 15/108* (2013.01); *B29C 48/0022* (2019.02); *B29L 2031/265* (2013.01)

(58) Field of Classification Search
CPC ........ F16J 15/025; F16J 15/102; F16J 15/104; F16J 15/108; B29C 48/0021; B29C 48/0022; B29L 2031/265
See application file for complete search history.

(56) References Cited

U.S. PATENT DOCUMENTS 2,972,600 A 2/1961 Braidwood
3,287,440 A 11/1966 Giller
(Continued)

FOREIGN PATENT DOCUMENTS

EP 2 519 581 B1 3/2015
WO WO 01/072894 A1 10/2001
(Continued)

OTHER PUBLICATIONS

International Search Report and Written Opinion for PCT/US2021/051713 dated Dec. 2, 2021, 10 pages.

*Primary Examiner* — Nicholas L Foster
(74) *Attorney, Agent, or Firm* — Dority & Manning, P.A.

(57) ABSTRACT

An extrusion molded gasket and a method of making such a gasket comprising one or more annular sections configured to engage a door rim of an appliance tub, one or more annular sections configured to engage the appliance tub, and one or more sealing sections disposed therebetween, wherein the gasket comprises at least one thermoplastic vulcanizate comprising at least 15 wt %, by weight of the thermoplastic vulcanizate (TPV), of a cross-linkable ethylene-based elastomer and within a range from 5 to 30 wt %, by weight of the TPV, of at least one thermoplastic, the TPV having a Shore Hardness within a range from 35 A to 100 A
(Continued)

(or 50 D), and wherein the TPV is extrusion molded into the gasket.

20 Claims, 4 Drawing Sheets

(56) References Cited

U.S. PATENT DOCUMENTS

| | | | | |
|---|---|---|---|---|
| 4,159,829 | A | * | 7/1979 | Ditcher .............. B29D 99/0053 277/606 |
| 4,311,628 | A | | 1/1982 | Abdou-Sabet et al. |
| 4,487,421 | A | * | 12/1984 | Housas .............. B29D 99/0053 285/379 |
| 4,916,799 | A | * | 4/1990 | Skinner .................. F16J 15/027 264/296 |
| 5,100,947 | A | | 3/1992 | Puydak et al. |
| 5,157,081 | A | | 10/1992 | Puydak et al. |
| 5,290,886 | A | | 3/1994 | Ellul |
| 5,397,832 | A | | 3/1995 | Ellul |
| 5,656,693 | A | | 8/1997 | Ellul et al. |
| 5,936,028 | A | | 8/1999 | Medsker et al. |
| 5,952,425 | A | | 9/1999 | Mesker et al. |
| 6,437,030 | B1 | | 8/2002 | Coran et al. |
| 6,451,915 | B1 | | 9/2002 | Ellul et al. |
| 6,867,260 | B2 | | 3/2005 | Datta et al. |
| 7,469,905 | B2 | | 12/2008 | Knapp |
| 7,955,540 | B2 | | 6/2011 | Zacarias et al. |
| 8,262,092 | B2 | | 9/2012 | Koh et al. |
| 2005/0242571 | A1 | * | 11/2005 | Houghton ............. F16L 17/035 277/626 |
| 2022/0333724 | A1 | * | 10/2022 | Weih ................. B29C 45/14549 |
| 2023/0400136 | A1 | * | 12/2023 | Weih ....................... F16L 47/08 |
| 2024/0092007 | A1 | * | 3/2024 | Anantha Narayana Iyer .............. B29C 48/022 |

FOREIGN PATENT DOCUMENTS

| | | |
|---|---|---|
| WO | WO 2015/132190 A1 | 9/2015 |
| WO | WO 2015/150218 A1 | 10/2015 |
| WO | WO 2019/143420 A1 | 7/2019 |

\* cited by examiner

EXTRUSION MOLDED THERMOPLASTIC VULCANIZATE GASKETS AND METHODS OF MAKING SUCH GASKETS

CROSS REFERENCE TO RELATED APPLICATIONS

This application is the national stage entry of International Patent Application No. PCT/US2021/051713 having a filing date of Sep. 23, 2021, which claims the priority benefit of U.S. Ser. No. 63/126,191, filed Dec. 16, 2020, which are incorporated herein by reference.

FIELD OF THE INVENTION

The present invention is directed to extrusion molded gaskets, and in particular to the use of thermoplastic vulcanizates in extrusion molded gaskets, especially, water-tight gaskets.

BACKGROUND

Thermoset and other rubbers (e.g., ethylene-propylene-diene terpolymers, styrenic block copolymers, etc.) are conventionally used in washing machine door seal gaskets such as disclosed in U.S. Pat. No. 8,262,092. These gaskets are typically injection molded into the desired shape. For instance, front door gaskets for washing machines are typically manufactured using injection molding process. Once the gasket design is created an injection molding tool is cut and shaped for manufacturing these gaskets. The gaskets are typically made using single thermoplastic or thermoset elastomer due to process limitations. Once the gasket's design is finalized, it is difficult to modify the gasket for different or improved performance due to technical challenges and high cost.

Further, the gaskets may contain organic and/or oleochemicals (e.g., slip agents) to reduce the coefficient of friction (COF) of the gasket surface and the surfaces are exposed to water and detergents thus making the COF-reducing agents prone to easily wash-off. This could result in increase in COF after wash and over the service life of the product.

What would be desirable is an improved gasket and method of making gaskets to reduce their cost and make them more functional and have improved lifetime of use.

Other references of interest include U.S. Pat. No. 7,955,540, WO 2019/143420 and WO 2015/132190.

SUMMARY

Disclosed is an extrusion molded gasket comprising (or consisting of, or consisting essentially of) one or more annular sections configured to engage a door rim of a tub, one or more annular sections configured to engage the tub, and one or more sealing sections disposed therebetween, wherein the gasket comprises at least one thermoplastic vulcanizate (TPV) comprising at least 15 wt %, by weight of the TPV, of a cross-linkable ethylene-based elastomer and within a range from 5 to 30 wt %, by weight of the TPV, of at least one thermoplastic, the TPV having a Shore A Hardness within a range from 35, or 45 to 80, or 100 (or, 50 D), and wherein the TPV is extrusion molded into the gasket.

Also disclosed is a method of making gasket comprising (or consisting of, or consisting essentially of) extrusion molding at least one TPV into a annular form having one or more annular sections configured to engage a door rim of a tub, one or more annular sections configured to engage the tub, and one or more sealing sections disposed therebetween, cutting the annular form to a desired length such that the annular form has two ends, and fusing one end of the annular form to other end to create a continuous annular gasket wherein at least one TPV comprising at least 15 wt %, by weight of the TPV, of a cross-linkable ethylene-based elastomer and within a range from 5 to 30 wt %, by weight of the TPV, of at least one thermoplastic, the TPV having a Shore A Hardness within a range from 35, or 45 to 80, or 100 (or, 50 D).

BRIEF DESCRIPTION OF THE DRAWINGS

The invention will be described with assistance from the following drawings.

DETAILED DESCRIPTION

The problems of the prior art can be solved by the use of TPV materials containing silicone based, non-migratory type slip agent. The design of gaskets used in water and detergent-containing appliances can be tailored for multiple hardness regions within the same gasket, and process limitations can be solved by changing manufacturing process to use an extrusion molding process. Such innovations allow for appliance gaskets that can be manufactured using extrusion process which is much more versatile and cost effective than injection molding processes. TPVs of various hardness such as Shore 35 A to 50 D hardness can be co-extruded continuously and then can be cut into specified length and fused using a heat welding process or ultra-sound technique to make a continuous annular gasket for water tight appliance door seals. In this extrusion molding manner gaskets with multi-hardness cross sections can be formed that cannot be achieved with injection molding. The extrusion molding technique can provide design flexibility of using different hardness TPV grades and also provide ease changing and modify seal design as and when required by changing extrusion die.

Current appliance bellows seals, or "gaskets", are comprised of a homogeneous material, typically a low durometer (hardness) EPDM in the 40 A to 45 A Shore hardness range. The low hardness is needed for the seal to function properly by providing the compliance necessary to provide a water-tight seal, allow large axial movements and to minimize vibration and noise transmission from the wash tub to the appliance frame. However, the softer material can be prone to premature abrasion failure and cut and tear failures. Normally, these gaskets having a three-dimensional shape and are injection molded in one piece. The use of TPV in combination with an extrusion molded design offers many benefits over a single material construction. First, multiple materials can easily be combined in the extrusion process. This allows for a harder/higher modulus material to be employed in areas of high wear or where structural strength is needed, such as attachment or mounting areas. A softer, more flexible material can be employed in areas where enhanced sealing and low vibration transmission is needed. In addition a third material with an internal lubricant to reduce friction can be added to areas where improved abrasion resistance is needed. The combination of materials allows the designer to select a material for the specific function needed in each area of the gasket.

In addition, the manufacturing process of extrusion molding allows for lower cost tooling compared to injection molding which enables more design customization. The main body of the seal can be extruded in a continuous high speed process and automatically cut to the desired length. The ends of the extrusion are joined together in a separate molding process which allows the addition of 3D features, such as filler and detergent ports, and drains or even mounting tabs along the length of the gasket. Since the molded area is much smaller than the entire part, the tooling and equipment costs are much less than for the entire part when compared to injection molded gaskets. In addition, the molds for the joining process can be easily customized for various appliance models.

In particular, some sort of joining or "fusing" process is required to form a complete annular ring. This can be done via various thermal welding processes or via insert injection molding where the ends of the extrudate are placed into a smaller injection mold where TPV material is injected and creating a chemical bond to the extrudate they forming a complete finished part. The injection molded section may include added features to allow mounting locations, or ports where water, and detergent or other associated cleaning chemicals are introduced to, for instance, a washing machine. The molded section may be conducted at one or more locations on the part depending on the design needs.

Extrusion molding is a manufacturing process used to make pipes, hoses, rods, fibers, and other annular or cylindrical articles. In such a process, granules of the desired thermoplastic or thermoset material is formed into a melt or liquid which is forced through a die having the desired profile to form a long, linear, potentially complex-profiled, and/or tube-like shape. The shape of the die determines the shape of the tube. The extrudate is then cooled and forms a solid shaped article. The tube may be printed upon, and cut at equal intervals. The pieces may be rolled for storage or packed together. Shapes and profiles that can result from extrusion molding include T-sections, U-sections, square sections, I-sections, L-sections, circular sections, or much more complex profiles that lead to gaskets. Extrusion molding is distinct from injection molding, most importantly, in that injection molding processes are based on the molten die-casting method of manufacture. Such is absent from the extrusion molding process of making gaskets disclosed herein.

As used herein, a "thermoplastic vulcanizate" (or "TPV") refers to a cured composition of at least a cross-linkable ethylene-based elastomer and an alpha-olefin-based thermoplastic wherein the cross-linkable ethylene-based elastomer has been cross-linked, most preferably a cured blend of ethylene-propylene-diene rubber and polypropylene, such curing preferably taking place simultaneously with blending the components. The TPV's can include other ingredients, most preferably oils such as paraffinic oils, curatives, resins, and fillers such as clays and carbon black, and other materials as described in more detail below. TPV's that are "distinct" can be achieved using a different amount of ingredients and/or a different identity in the materials and/or a different process (temperature, shear, residence time) of blending and curing, all of which can achieve distinct end properties such as tensile, modulus, hardness, color, etc. Most preferably, the at least one TPV useful for the gaskets described herein comprise at least 15 wt %, by weight of the TPV, of a cross-linkable ethylene-based elastomer and within a range from 5 to 30 wt %, by weight of the TPV, of at least one thermoplastic, the TPV having a Shore A Hardness within a range from 35, or 45 to 80, or 100 (or, 50 D).

Such TPV's are useful in a number of articles of manufacture, and in particular, gaskets, preferably gaskets used for water-sealing between joints, doors, and openings. Thus in any embodiment is extrusion molded gasket comprising one or more annular sections configured to engage a door rim of a tub, one or more annular sections configured to engage the tub, and one or more sealing sections disposed therebetween, wherein the gasket comprises at least one TPV comprising at least 15 wt %, by weight of the TPV, of a cross-linkable ethylene-based elastomer and within a range from 5 to 30 wt %, by weight of the TPV, of at least one thermoplastic, the TPV having a Shore A Hardness within a range from 35, or 45 to 80, or 100 (or, 50 D), and wherein the TPV is extrusion molded into the gasket. By stating that there is "at least one" TPV, this can mean that there can be a mixture of two, three or more distinct TPV's in making the gasket, or this could mean that distinct TPV's can be co-extruded next to one another to form various sections of the profile of a gasket such that, for instance, one part of the gasket has a different hardness from the other section; or "at least one" can mean both.

In any embodiment, the at least one TPV has a 100% Modulus of at least 1, or 1.1, or 1.2 MPa, or within a range from 1, or 1.1, or 1.2 to 2, or 2.5, or 3 MPa. Also, in any embodiment the at least one TPV has a coefficient of friction of less than 2.2, or 2.0, or within a range from 1.5 to 2.0 or 2.2. Also, desirably, the gasket has a coefficient of friction of less than 2.2, or 2.0, or within a range from 1.5 to 2.0 or 2.2.

Advantageously, in any embodiment styrenic polymers, copolymers, terpolymers, etc. ("copolymers") are absent from the gasket. By "absent", what is meant is that such copolymers are not added to the formulation of the TPV in any form or at any time such that there is no detectable copolymer or copolymer reaction product in the final TPV, or, if present, is at a level of less than 4000, or 3000, or 2000, or 1000 ppm. Styrenic copolymer can include so called SEBS type copolymers, polystyrene, HIPS, SAN, and other such types of polymers and copolymers that include a styrenic monomer unit along its chain or as a pendant group from the polymer backbone.

In any embodiment, the TPV further comprises a non-migratory polysiloxane. Such non-migratory polysiloxanes are described in more detail below. These non-migratory polysiloxanes may be present in the TPV within a range from 0.5, or 1, or 2 wt % to 5, or 6, or 8 wt % based on the weight of the TPV and all its ingredients.

As described below, the at least one TPV will comprise several other ingredients, such as, for instance, the TPV's useful herein may further comprise within a range from 10 wt % to 60 wt %, by weight of the TPV, of an oil. In any embodiment, the at least one TPV consists essentially of (or consists of) the cross-linkable ethylene-based elastomer, thermoplastic, oil, resin, clay, carbon black, a non-migratory silicon-slip agent, and curatives.

In any embodiment, the gasket described herein forms a water-tight seal between an appliance tub containing water and a door rim that sealingly fits against the appliance tub, the gasket forming a seal between the appliance tub and door rim. By "sealingly fits", what is meant is that the gasket conforms to the shape upon which it is mounted, on the one hand, and at least a portion of its surface conforms to the shape of a mating surface used to form a seal, such as a hinged door to a clothing washing machine or dish washing machine, such that when the door is closed to form a container for the water, detergent and clothing (or dishes) therein the gasket does not allow water to escape the container.

As mentioned, the gaskets described herein can take many forms and comprise any number of TPV's as either a mixture, distinct layered structure, or both. In any embodiment, two or three distinct TPVs are co-extrusion molded to form a continuous gasket profile. Also, in any embodiment the extrusion molded gasket is extruded into an annular shape, and wherein the ends are fused to one another to create a continuous annular gasket. Alternatively, the ends of the gasket may be connected by an extrusion molded or injection molded connecting piece or section.

The desired structure and form of the gaskets described herein are ideally suited for being made by an extrusion molding process. Thus, most preferably, the gasket is formed by an extrusion molding process. A method of making gasket comprising extrusion molding at least one TPV into a annular form having one or more annular sections configured to engage a door rim of a tub, one or more annular sections configured to engage the tub, and one or more sealing sections disposed therebetween, cutting the annular form to a desired length such that the annular form has two ends, and fusing one end of the annular form to other end to create a continuous annular gasket wherein at least one TPV comprising at least 15 wt %, by weight of the TPV, of a cross-linkable ethylene-based elastomer and within a range from 5 to 30 wt %, by weight of the TPV, of at least one thermoplastic, the TPV having a Shore A Hardness within a range from 35, or 45 to 80, or 100.

The formation of a die is achieved by using a machined die having the profile of the gasket that is desired, wherein at least one channel is used to convey the molten TPV or mixture of distinct TPV's through the form and form an extrudate out the other side of the die where it cools into the desired form. Alternatively, or additionally, more than one channel can be used to convey distinct TPV's through the die such that, for instance, the "one or more annular sections configured to engage a door rim of a tub" may be one type of TPV, and the "one or more sealing sections disposed therebetween" may be a distinct TPV having a hardness or modulus that is distinct from the other TPV used to make the gasket. An example of a die useful for extruding TPV's is disclosed in U.S. Pat. No. 7,955,540, where separate channels or sections may allow molten TPV from the extruder to pass through distinct portions of the flow design that forms the gasket, or the distinct TPV's may come together to form an intimate blend before passing through the flow design.

Figure 1:
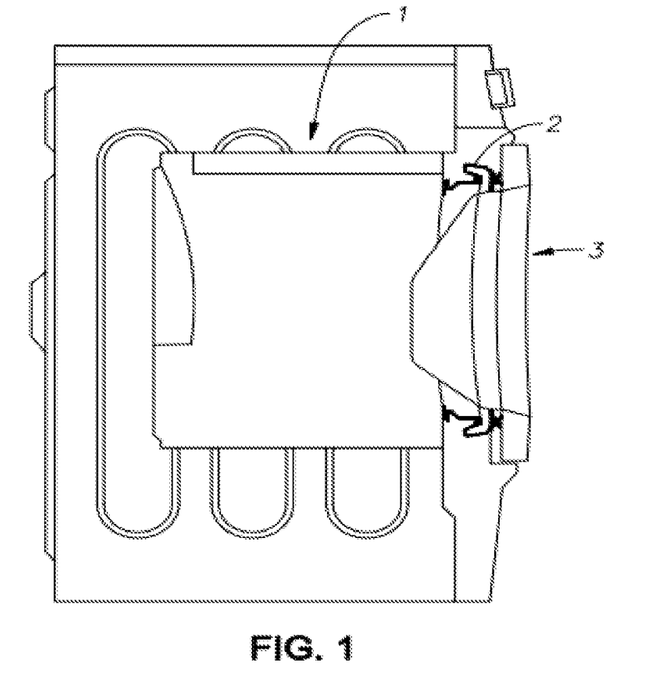
FIG. 1 is a side-sectional view illustrating a washing machine tub, door and extrusion molded gasket.
Figure 2:
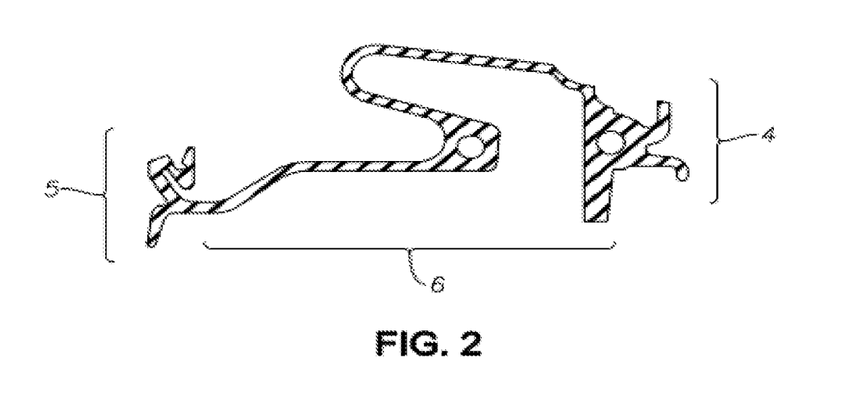
FIG. 2 is a cross-sectional view illustrating an exemplary profile of an extrusion molded gasket.

An exemplary embodiment is shown in the Figures. FIG. 1 shows a side-sectional view of a washing machine, including a tub 1, an extrusion molded gasket 2, and a door 3. FIG. 2 shows an exemplary profile of an extrusion molded gasket, which includes one or more annular sections to engage a door rim 4, one or more annular sections to engage the tub 5, and one or more sealing sections 6 therebetween. The one or more sealing sections may be of the same type of TPV as the one or more annular sections, or distinct TPVs having different hardness or modulus.

Figure 3:
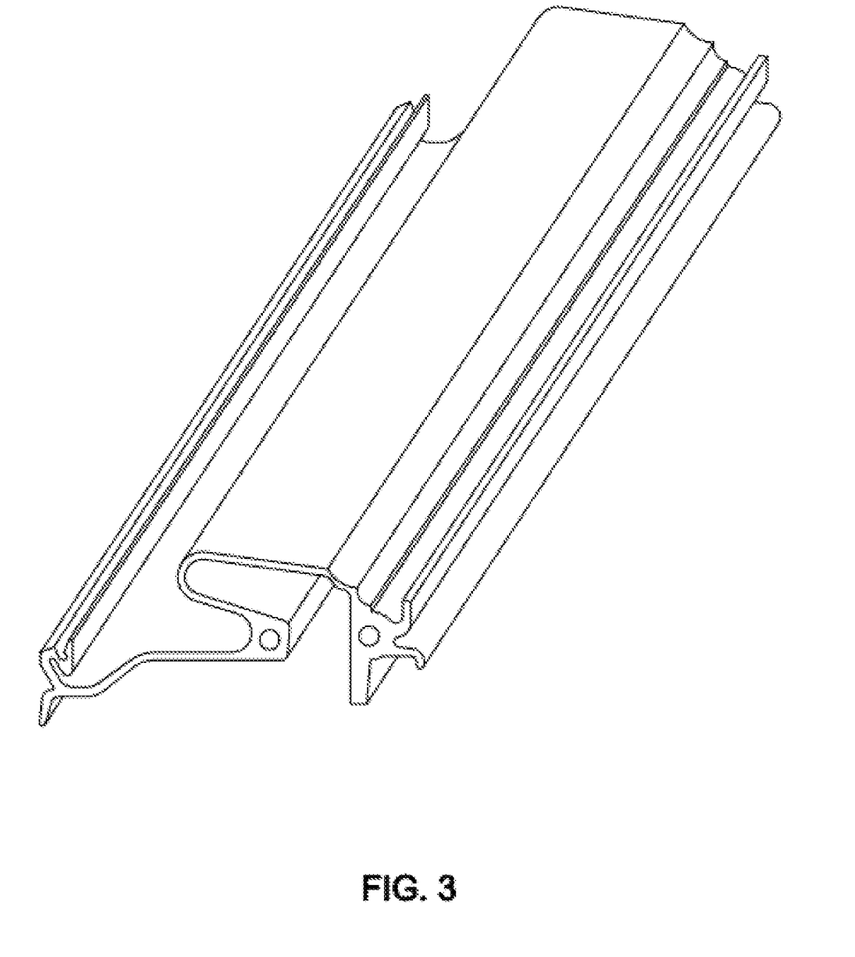
FIG. 3 illustrates a section of an exemplary extrusion molded gasket.
Figure 4:
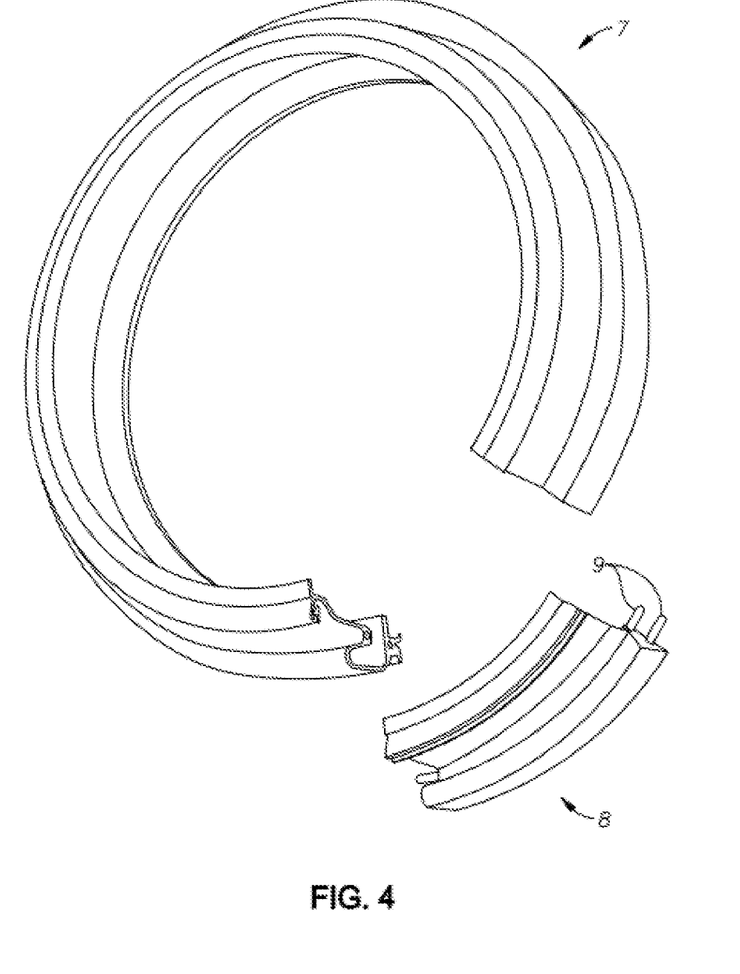
FIG. 4 illustrates an exemplary extrusion molded gasket that is bent into a ring and connected with an extrusion or injection molded connecting piece.
Figure 5:
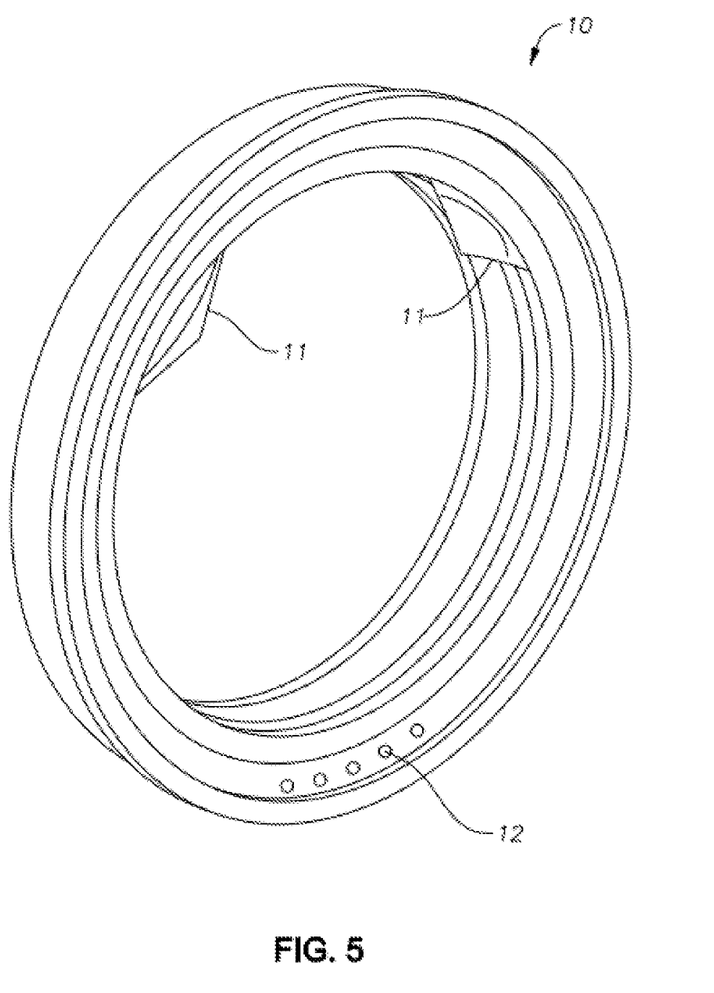
FIG. 5 illustrates a completed extrusion molded gasket, including drain holes and attached tabs.

FIG. 3 shows a section of an exemplary extrusion molded gasket with the profile of FIG. 2. FIG. 4 shows an extrusion molded gasket that is bent into an annular or ring shape 7. The ends of the extrusion molded gasket may be fused together, or they may be connected with an extrusion molded or injection molded connector piece 8. The connector piece may include pins 9 to aid in making the connections. FIG. 5 shows a completed extrusion molded gasket 10, which may further include injection molded tabs 11, drain holes 12, or other features.

Some of the main ingredients that are used in making TPV's are described here.

Cross-Linkable Ethylene-Based Elastomer

The major materials employed to form the TPV include those polymers that are capable of being cured or cross-linked. Reference to such materials may include mixtures of more than one polymer. Non-limiting examples of suitable polymers include olefinic elastomeric copolymers, butyl elastomer, and mixtures thereof. In one or more embodiments, olefinic elastomeric copolymers include ethylene-propylene-non-conjugated diene elastomers or propylene-based elastomer copolymers containing units derived from non-conjugated diene monomers.

Most preferred materials to form the major component of the TPV is a cross-linkable ethylene-based elastomer (comprising at least 30 wt % ethylene-derived units and from 0.1 to 10 wt % diene-derived units), and are most preferably ethylene-propylene copolymers polymerized from ethylene, propylene, and at least one diene monomer. The diene monomers may include, but are not limited to, 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof.

The cross-linkable ethylene-based elastomer may include from 40 to 85% by weight, or from 50 to 70% by weight, or from 60 to 66% by weight of units derived from ethylene based on the total weight of ethylene and propylene in the elastomer. In addition, the elastomer may contain from 0.1 to 15% by weight, or from 0.5 to 12% by weight, or from 1 to 10% by weight, or from 2 to 8% by weight of units derived from diene monomer. Expressed in mole percent, the elastomer may include from 0.1 to 5 mole percent, or from 0.5 to 4 mole percent, or from 1 to 2.5 mole percent units derived from diene monomer. In one or more embodiments, where the diene includes 5-ethylidene-2-norbornene, the cross-linkable ethylene-based elastomer may include at least 1% by weight, or at least 3% by weight, or at least 4% by weight, or at least 5% by weight, or from 1 to 15% by weight, or from 5% to 12% by weight, or from 7% to 11% by weight units deriving from 5-ethylidene-2-norbornene. In one or more embodiments, where the diene includes 5-vinyl-2-norbornene, the cross-linkable ethylene-based elastomer may include at least 1% by weight, or at least 3% by weight, or at least 4% by weight, or at least 5% by weight, or from 1 to 15% by weight, or from 5% to 12% by weight, or from 7% to 11% by weight units deriving from 5-vinyl-2-norbornene.

The cross-linkable ethylene-based elastomer may have a weight average molecular weight ($M_w$) that is greater than 100,000 g/mole, or greater than 200,000 g/mole, or greater than 400,000 g/mole, or greater than 600,000 g/mole. Preferably, the $M_w$ of the cross-linkable ethylene-based elastomer is less than 1,200,000 g/mole, or less than 1,000,000 g/mole, or less than 900,000 g/mole, or less than 800,000 g/mole.

Useful cross-linkable ethylene-based elastomers may have a number average molecular weight ($M_n$) that is greater than 20,000 g/mole, or greater than 60,000 g/mole, or greater than 100,000 g/mole, or greater than 150,000 g/mole. The $M_n$ of the cross-linkable ethylene-based elastomers may be less than 500,000 g/mole, or less than 400,000 g/mole, or less than 300,000 g/mole, or less than 250,000 g/mole.

Techniques for determining the molecular weight ($M_n$, $M_w$, and $M_z$) and molecular weight distribution (MWD) may be found in U.S. Pat. No. 4,540,753, and by Verstrate et al. in 21 MACROMOLECULES, 3360 (1988), both of which are incorporated herein by reference.

The cross-linkable ethylene-based elastomer used herein may also be characterized by having a Mooney viscosity ($ML_{(1+4)}$ at 125° C.) per ASTM D-1646, of from 10 to 500, or from 50 to 450.

In some embodiments, the cross-linkable ethylene-based elastomer may be characterized by having an intrinsic viscosity, as measured in decalin at 135° C. per ASTM D-1601, of from 1 to 8 dl/g, or from 3 to 7 dl/g, or from 4 to 6.5 dl/g.

In some embodiments, the cross-linkable ethylene-based elastomer used herein may have a glass transition temperature ($T_g$), as determined by Differential Scanning calorimetry (DSC) according to ASTM E-1356, that is less than -20° C., in other embodiments less than -30° C., in other embodiments less than -50° C., and in other embodiments from -20 to -60° C.

Suitable cross-linkable ethylene-based elastomers may be manufactured or synthesized by using a variety of techniques. For example, these copolymers can be synthesized by employing solution, slurry, or gas phase polymerization techniques that employ various catalyst systems. Exemplary catalysts include Ziegler-Natta systems such as those including vanadium catalysts, and single-site catalysts including constrained geometry catalysts involving Group IV-VI metallocenes. Elastomeric copolymers are commercially available under the tradenames Vistalon™ (ExxonMobil Chemical Company), Keltan™ (Arlanxeo), Nordel IP™ (Dow), Nordel MG™ (Dow), Royalene™ (Lion Elastomers) and Buna™ (Arlanxeo).

In any embodiment the cross-linkable ethylene-based elastomer comprises at least 15 wt %, and preferably from 15 to 80 wt %, such as from 15 to 70 wt %, such as from 25 to 60 wt % of the total weight of the at least one TPV.

The elastomer is at least partially cured by employing dynamic vulcanization techniques. Dynamic vulcanization refers to a vulcanization or curing process for an elastomer contained in a blend that includes the elastomer and at least one thermoplastic resin. The elastomer is vulcanized under conditions of shear and extension at a temperature at or above the melting point of the thermoplastic resin. The elastomer is preferably simultaneously cross-linked and dispersed (preferably as fine particles) within the thermoplastic resin matrix, although other morphologies, such as co-continuous morphologies, may exist depending on the degree of cure, the elastomer to plastic viscosity ratio, the intensity of mixing, the residence time, and the temperature.

After dynamic vulcanization, the elastomer is in the form of finely-divided and well-dispersed particles of vulcanized or cured elastomer within a continuous thermoplastic or matrix, although a co-continuous morphology is also possible. In those embodiments where the cured elastomer is in the form of finely-divided and well-dispersed particles within the thermoplastic medium, the elastomer particles typically have an average diameter that is less than 50 µm, or less than 30 µm, or less than 10 µm, or less than 5 µm, or less than 1 µm. In preferred embodiments, at least 50%, or at least 60%, or at least 75% of the elastomer particles have an average diameter of less than 5 µm, or less than 2 µm, or less than 1 µm.

The elastomer within the composition is preferably at least partially cured. In one or more embodiments, the elastomer is advantageously completely or fully cured. The degree of cure can be measured by determining the amount of elastomer that is extractable from the TPV by using cyclohexane or boiling xylene as an extractant. Preferably, the elastomer has a degree of cure where not more than 15 wt %, or not more than 10 wt %, or not more than 5 wt %, or not more than 3 wt % is extractable by cyclohexane at 23° C. as described in U.S. Pat. Nos. 4,311,628, 5,100,947 and 5,157,081, all of which are incorporated herein by reference. Alternatively, the elastomer has a degree of cure such that the crosslink density is at least $4\times10^{-5}$, or at least $7\times10^{-5}$, or at least $10\times10^{-5}$ moles per milliliter of elastomer. See Crosslink Densities and Phase Morphologies in Dynamically Vulcanized TPEs, by Ellul et al., in 68 ELASTOMER CHEMISTRY AND TECHNOLOGY, 573-584 (1995), which is incorporated herein by reference.

The elastomer may be dynamically vulcanized by employing various cure systems, which are known in the art. For example, phenolic resin, hydrosilation (a.k.a. silicon-containing cure systems), and free radical cure systems may be employed.

Useful phenolic cure systems are disclosed in U.S. Pat. Nos. 2,972,600, 3,287,440, and 6,437,030, which are incorporated herein by reference. In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to 10 carbon atoms.

Useful phenolic resins may be obtained under the tradenames SP-1044, SP-1045 (Schenectady International; Schenectady, N.Y.), which may be referred to as alkylphenol-formaldehyde resins.

An example of a phenolic resin curative includes that defined according to the general formula:

where Q is a divalent radical selected from the group consisting of —$CH_2$—, —$CH_2$—O—$CH_2$—; m is zero or a positive integer from 1 to 20 and R' is an organic group. In one embodiment, Q is the divalent radical —$CH_2$—O—$CH_2$—, m is zero or a positive integer from 1 to 10, and R' is an organic group having less than 20 carbon atoms. In other embodiments, m is zero or a positive integer from 1 to 10 and R' is an organic radical having between 4 and 12 carbon atoms.

The phenolic resin may be employed in an amount from 2 to 6 parts by weight, or from 3 to 5 parts by weight, or from 4 to 5 parts by weight per 100 parts by weight of elastomer.

A complementary amount of stannous chloride may include from 0.5 to 2.0 parts by weight, or from 1.0 to 1.5 parts by weight, or from 1.2 to 1.3 parts by weight per 100 parts by weight of elastomer. In conjunction therewith, from 0.1 to 6.0 parts by weight, or from 1.0 to 5.0 parts by weight, or from 2.0 to 4.0 parts by weight of zinc oxide may be employed. In one or more embodiments, the olefinic elastomer employed with the phenolic curatives includes diene units deriving from 5-ethylidene-2-norbornene.

Silicon-containing cure systems may include silicon hydride compounds having at least two SiH groups. Useful silicon hydride compounds include, but are not limited to, methylhydrogenpolysiloxanes, methylhydrogendimethylsiloxane copolymers, alkylmethyl-co-methylhydrogenpolysiloxanes, bis(dimethylsilyl)alkanes, bis(dimethylsilyl)benzene, and mixtures thereof.

Useful catalysts for hydrosilylation include, but are not limited to, transition metals of Group VIII. These metals include, but are not limited to, palladium, rhodium, and platinum, as well as complexes of these metals. Useful silicon-containing curatives and cure systems are disclosed in U.S. Pat. No. 5,936,028.

The silane-containing compounds may be employed in an amount from 0.5 to 5.0 parts by weight, or from 1.0 to 4.0 parts by weight, or from 2.0 to 3.0 parts by weight per 100 parts by weight of elastomer. A complementary amount of catalyst may include from 0.5 to 20.0 parts, or from 1.0 to 5.0 parts, or from 1.0 to 2.0 parts of metal per million parts by weight of the elastomer. In one or more embodiments, the olefinic elastomer employed with the hydrosilylation curatives includes diene units deriving from 5-vinyl-2-norbornene.

The cure system employed in practicing the present process may include a free-radical cure agent and a coagent. Free-radical cure agents include peroxides such as organic peroxides. Examples of organic peroxides include, but are not limited to, di-tert-butyl peroxide, dicumyl peroxide, t-butylcumyl peroxide, α,α-bis(tert-butylperoxy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals and mixtures thereof may be used.

Useful peroxides and their methods of use in dynamic vulcanization of TPVs are disclosed in U.S. Pat. No. 5,656,693, which is incorporated herein by reference.

The coagent may include a multi-functional acrylate ester, a multi-functional methacrylate ester, or combination thereof. In other words, the coagents include two or more organic acrylate or methacrylate substituents. Examples of multi-functional acrylates include diethylene glycol diacrylate, trimethylolpropane triacrylate (TMPTA), ethoxylated trimethylolpropane triacrylate, propoxylated trimethylolpropane triacrylate, propoxylated glycerol triacrylate, pentaerythritol triacrylate, bistrimethylolpropane tetraacrylate, pentaerythritol tetraacrylate, ethoxylated pentaerythritol tetraacrylate, ethoxylated pentaerythritol triacrylate, cyclohexane dimethanol diacrylate, ditrimethylolpropane tetraacrylate, or combinations thereof. Examples of multi-functional methacrylates include trimethylol propane trimethacrylate (TMPTMA), ethylene glycol dimethacrylate, butanediol dimethacrylate, butylene glycol dimethacrylate, diethylene glycol dimethacrylate, polyethylene glycol dimethacrylate, allyl methacrylate, or combinations thereof.
Thermoplastic The thermoplastic resin phase includes those thermoplastic polymers that include solid, generally high molecular weight plastic resins. Exemplary thermoplastic polymers include crystalline, semi-crystalline, and crystallizable polyolefins, olefin homo and copolymers, and non-olefin resins.

The thermoplastic polymer may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the reactor, impact, and random copolymers of propylene with ethylene or the higher α-olefins, described above, or with $C_{10}$-$C_{20}$ diolefins. Comonomer contents for these propylene copolymers may be from 1% to 30% by weight of the polymer, for example, as in U.S. Pat. No. 6,867,260, which is incorporated herein by reference. Copolymers available under the tradename Vistamaxx™ propylene-based elastomers (ExxonMobil Chemical Company) are specifically included.

Other suitable polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

The thermoplastic polymer may include propylene-based polymers including those solid, generally high-molecular weight plastic resins that primarily comprise units deriving from the polymerization of propylene. In certain embodiments, at least 75%, or at least 90%, or at least 95%, or at least 97% of the units of the propylene-based polymer derive from the polymerization of propylene. In particular embodiments, these polymers include homopolymers of propylene.

In certain embodiments, the propylene-based polymers may also include units deriving from copolymerization with ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof.

The propylene-based polymers may include semi-crystalline polymers. These polymers may be characterized by a crystallinity of at least 25% by weight, or at least 55% by weight, or at least 65% by weight, or at least 70% by weight. Crystallinity may be determined by dividing the heat of fusion of a sample by the heat of fusion of a 100% crystalline polymer, which is assumed to be 290 joules/gram for polypropylene.

In one or more embodiments, the propylene-based polymers may be characterized by an $H_f$ of at least 52.3 J/g, or in excess of 100 J/g, or in excess of 125 J/g, or in excess of 140 J/g.

In one or more embodiments, useful propylene-based polymers may be characterized by an $M_w$ of from 50 to 2,000 kg/mole, or from 100 to 600 kg/mole. They may also be characterized by a $M_n$ of 25 to 1,000 kg/mole, or 50 to 300 kg/mole, as measured by GPC with polystyrene standards.

In one or more embodiments, useful propylene-based polymers can have a MFR (ASTM D-1238, 2.16 kg@230° C.) of less than 100 dg/min, or less than 50 dg/min, or less than 10 dg/min, or less than 5 dg/min. In these or other embodiments, the propylene-based polymers can have a MFR of at least 0.1 dg/min, or 0.2 dg/min, or at least 0.5 dg/min.

In one or more embodiments, useful propylene-based polymers can have a melt temperature ($T_m$) that is from 110° C. to 170° C., or from 140° C. to 168° C., or from 160° C. to 165° C. They may have a glass transition temperature ($T_g$) of from −10° C. to 10° C., or from −3° C. to 5° C., or from 0° C. to 2° C. In one or more embodiments, they may have a crystallization temperature ($T_c$) of at least 75° C., or at least 95° C., or at least 100° C., or at least 105° C., or ranging from 105° C. to 130° C.

The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In particular embodiments, the propylene-based polymers include a homopolymer of a high-crystallinity isotactic or syndiotactic polypropylene. This polypropylene can have a density of from 0.89 to 0.91 g/cm³, with the largely isotactic polypropylene having a density of from 0.90 to 0.91 g/cm³. Also, high and ultra-high molecular weight polypropylene that has a fractional melt flow rate can be employed. In one or more embodiments, polypropylene resins may be characterized by a MFR (ASTM D-1238; 2.16 kg@230° C.) that is less than or equal to 10 dg/min, or less than or equal to 1.0 dg/min, or less than or equal to 0.5 dg/min.

In one or more embodiments, the thermoplastic includes, in addition to a polypropylene resin, a polyethylene resin. In one or more embodiments, this polyethylene resin includes at least 90%, or at least 95%, or at least 99% of the polymeric units derive from ethylene. In one or more embodiments, this polyethylene resin is a polyethylene homopolymer.

In one or more embodiments, the polyethylene used in conjunction with the polypropylene may be characterized by having a weight average molecular weight of from 100 to 250 kg/mole, or from 110 to 220 kg/mole, or from 150 to 200 kg/mole. This polyethylene may be characterized by having a molecular weight distribution (Mw/Mn) that is less than 12, or less than 11, or less than 10, or less than 9.

In one or more embodiments, the polyethylene used in conjunction with the polypropylene may be characterized by having a melt index from 1.2 to 12 dg/min, or from 0.4 to 10 dg/min, or from 0.5 to 8.0 dg/min, per ASTM D-1238 at 190° C. and 2.16 kg load.

In one or more embodiments, the polyethylene used in conjunction with the polypropylene may be characterized by an intrinsic viscosity as determined per ASTM D 1601 and D 4020 that is from 0.5 to 10 dl/g, or from 1.0 to 9.0 dl/g, or from 1.5 to 8.0 dl/g.

In one or more embodiments, the polyethylene used in conjunction with the polypropylene resin may be characterized by a density as measured per ASTM D4883 that is greater than 0.93 g/cm³, or greater than 0.94 g/cm³, or greater than 0.95 g/cm³.

Polymers useful as the polyethylene used in conjunction with the polypropylene may be generally referred to as high density polyethylene resins. For example, useful high density polyethylene resins include those available under the tradename HD7960.13 HDPE (ExxonMobil).

In any embodiment the thermoplastic comprises from 5 to 30 wt %, such as from 7 to 30 wt %, such as from 10 to 25 wt % of the total weight of the at least one TPV composition.

Non-Migratory Polysiloxane

The non-migratory polysiloxane comprises a non-migratory polysiloxane which is bonded to a thermoplastic material. The polysiloxane molecule is chemically attached to the thermoplastic molecule, preventing the physical migration of the siloxane molecule to the surface of the materials and is, therefore, referred as a non-migratory slip agent or non-migratory polysiloxane. When such molecule is present in the system it has now been found that migration of the polysiloxane to the surface is reduced, apparently by increasing its compatibility with the base polymeric material and yet the siloxane combination is very effective in reducing COF properties of a TPV formulation without effecting its bonding performance and surface quality.

The non-migratory polysiloxane is reactively dispersed in a thermoplastic material, which may be any homopolymer or copolymer of ethylene and/or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. In one preferred embodiment, the thermoplastic material is a polypropylene homopolymer.

Suitable methods of reactively bonding a polysiloxane to an organic thermoplastic polymer, such as a polyolefin, are disclosed in WO2015/132190 and WO2015/150218, both of which are incorporated herein by reference.

The functionality of the polysiloxane which is capable of reacting with the thermoplastic can be called a reactive functionality. This reactive functionality can be present in terminal groups. In other embodiments, the reactive functionality is present in pendant groups. In other embodiments, the reactive functionality is present in terminal and in pendant groups.

The reactive functionality can for example contain at least one of the following groups: alkenyl, Si—H, amino.

When the reactive functionality is an alkenyl functionality, the polysiloxane can for example contain vinyl groups, or alternatively other alkenyl groups such as hexenyl or allyl groups. The alkenyl groups can be pendant and/or terminal groups in the polysiloxane.

The reactive functionality of the polysiloxane can alternatively be Si—H functionality. The polysiloxane can contain hydrogen atoms pendant to Si atoms in the siloxane chain and/or hydrogen atoms attached to terminal Si atoms.

The reactive functionality of the polysiloxane can alternatively be an amino functionality. The amino functionality can for example be present in organic groups R which are aminoalkyl groups. The aminoalkyl group can for example be of the formula R'—(NH-A')$_q$—NH-A- wherein A and A' are each independently a linear or branched alkylene group having 1 to 6 carbon atoms and optionally containing an ether linkage; q is 0-4; R' is hydrogen or an alkyl or hydroxyalkyl group having 1 to 4 carbon atoms. Most preferably R' is hydrogen; q is 0 or 1; and A and A' (if present) each contain 2 to 4 carbon atoms.

Examples of preferred aminoalkyl groups include —$(CH_2)_3NH_2$, —$(CH_2)_4NH_2$, —$(CH_2)_3NH(CH_2)_2NH_2$, —$CH_2CH(CH_3)CH_2NH(CH_2)_2NH_2$, —$(CH_2)_3NHCH_2CH_2NH(CH_2)_2NH_2$, —$CH_2CH(CH_3)CH_2NH(CH_2)_3NH_2$, —$(CH_2)_3NH(CH_2)_4NH_2$ and —$(CH_2)_{30}(CH_2)_2NH_2$. The aminoalkyl groups can be pendant and/or terminal groups in the polysiloxane.

The polysiloxane may comprise siloxane units selected from M units of the formula $R_3SiO_{1/2}$, and/or D units of the formula $R_2SiO_{2/2}$, and/or T units of the formula $RSiO_{3/2}$, and/or Q units of the formula $SiO_{4/2}$, where each R represents an organic group or hydrogen atom bonded to silicon. Organic groups R in the polysiloxane other than the functional groups can for example be alkyl groups having 1 to 6 carbon atoms such as methyl or ethyl groups and/or aryl groups having 6 to 10 carbon atoms such as phenyl groups. If the unit bears more than one R, each R can be the same or different.

The polysiloxane may comprise predominantly D and/or T units, although it will usually contain terminal M units. Predominantly means containing more than 50% molar units. The polysiloxane can for example be a polydiorganosiloxane comprising at least 95% molar D units, optionally at least 99% D units. One example of a suitable polydiorganosiloxane is a vinyl-terminated polydimethylsiloxane.

The polysiloxane in some embodiments has a high molecular weight such as a number average molecular weight Mn of above 100,000 g/mole. The polysiloxane can for example have Mn above 200,000 g/mole, for example 200,000 to 2,000,000 g/mole. We have found that use of a polysiloxane of high molecular weight, particularly a polysiloxane of Mn above 200,000 g/mole, in the masterbatch can lead to a final polymer composition of enhanced scratch resistance compared to polysiloxane of lower molecular weight.

In some embodiments, the non-migratory polysiloxane may comprise predominantly D and/or T units and contains some alkenyl functionalities, which assist in the reaction with the polymer matrix. There is a covalent bond between the polysiloxane and the polypropylene.

In some embodiments, the non-migratory polysiloxane has a number average molecular weight of 200,000 to 2,000,000 g/mole. The number average molecular weight of the reaction product of the polysiloxane and the polymer matrix is normally at least 1.1 times, preferably at least 1.3 times, the number average molecular weight of the base polysiloxane.

In some embodiments, the non-migratory polysiloxane has a gum loading of between 20 and 50 wt %.

One suitable commercially available material useful as the non-migratory polysiloxane is HMB-0221 available in the form of a masterbatch from Dow Corning.

Generally, the TPV composition described herein contains from 0.2 to 20 wt %, such as from 0.2 to 15 wt %, such as from 0.2 to 10 wt % of the non-migratory polysiloxane.

Additional Additives

The TPV composition describe herein may include any or all of the optional additives conventionally included in thermoplastic elastomer compositions.

Fillers that may optionally be included include those reinforcing and non-reinforcing fillers or extenders that are conventionally employed in the compounding of polymeric materials. Useful fillers include carbon black, calcium carbonate, clays, silica, talc, and titanium dioxide.

Plasticizers, extender oils, synthetic processing oils, or a combination thereof may also be optionally added to the blend. The extender oils may include, but are not limited to, aromatic, naphthenic, and paraffinic extender oils. Exemplary synthetic processing oils are polylinear α-olefins, polybranched α-olefins, and hydrogenated polyalphaolefins. The TPV's disclosed herein may include organic esters, alkyl ethers, or combinations thereof, such as disclosed in U.S. Pat. Nos. 5,290,886, and 5,397,832 both of which are incorporated herein by reference. The addition of certain low to medium molecular weight organic esters and alkyl ether esters to the compositions of the invention dramatically lowers the Tg of the polyolefin and elastomer components, and of the overall composition, and improves the low temperatures properties, particularly flexibility and strength. These organic esters and alkyl ether esters generally have a molecular weight that is generally less than 10,000 g/mole. It is believed that the improved effects are achieved by the partitioning of the ester into both the polyolefin and elastomer components of the compositions. Particularly suitable esters include monomeric and oligomeric materials having an average molecular weight below 2000 g/mole, and preferably below 600 g/mole. The ester should be compatible, or miscible, with both the polyolefin and elastomer components of the composition; i.e., that it mix with the other components to form a single phase. The esters found to be most suitable were either aliphatic mono- or diesters or alternatively oligomeric aliphatic esters or alkyl ether esters. Polymeric aliphatic esters and aromatic esters were found to be significantly less effective, and phosphate esters were for the most part ineffective. Synthetic polyalphaolefins are also useful in lowering Tg.

Oligomeric extenders may also optionally be used. Preferred oligomeric extenders include copolymers of isobutylene and butene or copolymers of butadiene together with a complementary comonomer. These oligomeric extenders typically have a number average molecular weight of less than 1,000 g/mole. Useful oligomeric extenders are commercially available.

Polymeric processing additives may also optionally be added. These processing additives may include polymeric resins that have a very high melt flow index. These polymeric resins include both linear and branched molecules that have a melt flow rate that is greater than 500 dg/min, or greater than 750 dg/min, or greater than 1000 dg/min, or greater than 1200 dg/min, or greater than 1500 dg/min. Mixtures of various branched or various linear polymeric processing additives, as well as mixtures of both linear and branched polymeric processing additives may be used. The preferred linear polymeric processing additives are polypropylene homopolymers. The preferred branched polymeric processing additives include diene-modified polypropylene polymers. TPVs that include similar processing additives are disclosed in U.S. Pat. No. 6,451,915, which is incorporated herein by reference.

The amounts of the cross-linkable elastomer, thermoplastic polymer, first and non-migratory polysiloxanes and optional additives are typically controlled to produce a TPV composition having a Shore A Hardness of less than 60, such as from 25 to 55 as measured by ASTM D2240.

Production of Thermoplastic Vulcanizate

The thermoplastic vulcanizate composition described herein is produced by supplying the cross-linkable elastomer, the thermoplastic polymer, the first and non-migratory polysiloxanes and any option additives to a mixer, such as screw extruder, and then mixing the components under conditions such that the thermoplastic polymer melts and the elastomer is at least partially cross-linked to produce a heterogeneous product comprising particles of the at least partially cross-linked elastomer dispersed in a matrix comprising the thermoplastic polymer. Suitable conditions include a temperature from 170° C. to 250° C., such as from 190° C. to 230° C.

In a preferred embodiment, the non-migratory polysiloxane is supplied to the mixer together with the cross-linkable elastomer and the thermoplastic polymer as a first mixture, while other additives may be supplied to the mixer after at least partial melting of the thermoplastic polymer to form a second mixture. That is, the non-migratory polysiloxane along with the cross-linkable elastomer and the thermoplastic polymer are supplied to the mixer and well-mixed and at least partially melted to form a first mixture. For example, in the case of mixing in a screw extruder.

Use of the Thermoplastic Vulcanizate Composition(s)

The TPV composition described herein is useful in a variety of applications, especially in the production of articles, such as, for example, vehicle components, especially interior and exterior parts, for automobiles, airplanes, train cars, All Terrain Vehicles (ATVs), snowmobiles, boats, jet skis, motorcycles, and any other 2, 4 or more wheeled vehicles. Specific vehicle parts include, but are not limited to, exterior weather seals such as, glass run channels, corner molds, fuel door seals, body sealing low friction skin, trunk seals, tailgate seals, cowl seals, gap fillers, glass encapsulation, cut line seals, door seals, hood-to-radiator seals, windshield seals, sunroof seals, roof line seals, rear window seals, rocker panels, sashes, and belt-line seals, end-caps and others, for example. Other particular automotive exterior weather seals can be found at http:\\www.santoprene.com.

In any embodiment, the TPVs are most preferably useful in gaskets, in particular, water sealing gaskets that form a water-tight seal between some container for water and a cover or lid for such container. In any embodiment the gasket comprises one or more annular sections configured to engage a door rim of an appliance tub, one or more annular sections configured to engage the appliance tub, and one or more sealing sections disposed therebetween. Thus, the minimum requirement is that the gasket have annular sections that will sealingly engage the door rim of a tub such as an appliance tub and one or more annular sections that sealingly engage the tub itself such that when the door is closed against the tub the gasket provides a water-tight seal for water and/or water/detergent mixtures within the tub. The gasket is most preferably formed by extrusion molding processes into an annular form which can be welded at the ends by heat or ultrasonic techniques well known in the art, thus forming a continuous ring. An example of a desirable gasket is shown in, for example, U.S. Pat. No. 8,262,092. As can be seen from this disclosure, gaskets, and in particular, water-sealing gaskets, can take on many distinct three-dimensional cross-sectional forms in order to function as a seal between a water containing tub and a door that closes around the opening of that tub to hold the water inside the closed tub.

In any embodiment, extrusion molding a TPV is be carried out by providing a melt-blender having a die through which melt-blended TPV passes to form a shaped article; wherein the die comprises a flow design having at least one flow branch having a tapered or conical angle and a flow reservoir at the end of each flow branch; and wherein the taper angle of the flow design preferably ranges from 5 to 20 degrees; then melt-blending a thermoplastic and an elastomer with an organic peroxide curative in the melt-blender to form a TPV; and finally passing the melt-blended TPV through the flow design to form the shaped article, preferably in the profile of the gasket.

As used herein, "melt-blender" refers to any type of apparatus that is capable of blending materials such as thermoplastics (e.g., polyethylene, polypropylene, etc.) and elastomers (e.g., ethylene-propylene-diene rubber, butyl rubber, etc.) by imposing enough sheer to melt the materials and create a blend of the materials. Examples include single and twin-screw extruders, so-called mega extruders, Brabender melt mixers and the like.

As used herein, "die" refers to an orifice-containing element mounted at the end of an extruder, which gives the extrudate its final shape. Stated another way, the die is a component of a melt-blender that allows molten material to flow through a relatively small orifice or slit, the orifice or slit being shaped into the desired profile of the article to be made. The die comprises a "flow design", which refers to the shape and size of the overall orifice or slit through which molten material can flow to be formed into a shaped article. The flow design in one embodiment of the present invention possesses at least one "flow branch" and a "flow reservoir" located at the end of each flow branch. Preferably, each flow branch possesses a taper angle of between 5 and 20 degrees, more preferably between 8 and 16 degrees, and even more preferably between 9 and 14 degrees. The taper angle is defined by the difference in the openings of the flow design from the die front (smaller) to the die back (larger).

The flow reservoir is characterized in that it is larger in size on the die back side of the die, but tapers to the same size as the surrounding flow branch on the die front. Thus, an area of greater volume of molten material can flow into the flow reservoir relative to the other portions of the flow design.

The one or more TPV's can be extruded by first providing a melt-blender having a die through which melt-blended TPV(s) passes to form a shaped article; wherein the die comprises a flow design having at least one flow branch having a taper angle and a flow reservoir at the end of each flow branch; and wherein the taper angle of the flow design ranges from 5 to 20 degrees; followed by melt-blending a thermoplastic and an elastomer with an organic peroxide curative in the melt-blender to form a TPV; and finally, passing the melt-blended TPV through the flow design to form the shaped article. The TPV may have already been dynamically vulcanized prior to extruding through the die, that is, provided to the manufacturer of the gaskets as a solid TPV in the form of blocks or pellets for example; or the individual ingredients may be extrusion blended followed by extrusion through the die. If a multi-structured or multi-hardness gasket is desired, multiple extruders can be used to extrude the two, three or more distinct TPV's through one or more dies that ultimately form the multi-hardness gasket. In this manner, two or three distinct thermoplastic vulcanizates may be co-extrusion molded to form a continuous gasket profile that is multi-hardness in profile, thus providing distinct hardnesses to various portions of the gasket that extend through the annular feature of the gasket. For instance, the one or more annular sections configured to engage a door rim of a tub may be formed from a TPV having a Shore Hardness of 40 A, while one or more annular sections configured to engage the tub may be formed from a TPV having a Shore Hardness of 45 D, and one or more sealing sections disposed therebetween may be formed from a TPV having yet another Shore Hardness, such as 35 A.

The melt blending is generally performed at a temperature not exceeding 400° C., preferably not exceeding 300° C. and more particularly not exceeding 250° C. The minimum temperature at which the melt blending is performed is generally higher than or equal to 130° C., preferably higher than or equal to 150° C. and more particularly higher than 180° C. The blending time is chosen by taking into account the nature of the compounds used in the TPV composition and the blending temperature. The time generally varies from 5 second to 120 minutes, and in most cases from 10 seconds to 30 minutes.

In any embodiment, the output of TPV melt from the die is greater than 15, or 20, or 30 kg/hr, or within a range from 15 to 30 kg/hr, or more preferably within a range from 16 to 28 kg/hr, or most preferably within a range from 18 to 25 kg/hr in yet another embodiment.

The following examples are non-limiting tests and data showing the usefulness and utility of the claimed invention(s).

Examples

The two TPV's outlined in Table 1 were extrusion molded into gaskets having first and second annular sections, and a sealing section therebetween, through an appropriately machined die for such profile using single screw extruder with L/D ratio 24:1 to 30:1, and for comparison, an injection molded EPDM (cured, Shore A of 43, 100% Modulus of 0.8, 1.18 g/cm$^3$ density, COF of 2.22) gasket was also made.

The Coefficient of Friction (COF) was determined a weighted sled sample over a glass surface, the test distance was 200 mm, and the test weight was 350 grams, the COF being the force required to pull the sled with the sample of material thereunder.

Shore A Hardness and Shore D Hardness was measured according to ISO 868.

Modulus at 100% extension was measured according to ISO 37-2.

TABLE 1

Composition of Exemplary TPV's

|  | TPV1 | TPV2 | TPV3 |
| --- | --- | --- | --- |
| Ingredients (wt %) |  |  |  |
| EPDM | 51.2 | 50.2 | 42.0 |
| hPP | 7.2 | 10.0 | 3.4 |
| paraffinic oil | 24.5 | 22.7 | 29.0 |
| clay | 12.9 | 12.0 | 2.9 |
| resin | 1.8 | 2.1 | 2.4 |
| carbon black | 1.5 | — | 1.2 |
| stannous chloride | 0.5 | 0.5 | 0.4 |
| non-migratory polysiloxane | — | — | 4.8 |
| silicon based slip agent | — | — | 3.8 |
| ZnO | 0.4 | 0.6 | 0.5 |
| MgO | — | 1.9 | — |
| propylene-based elastomer | — | — | 9.6 |
| Properties |  |  |  |
| Shore A Hardness | 50 | 62 | 50 |
| 100% Modulus (MPa) | 1.4 | 1.9 | 1.3 |
| COF (force/force) | 2.14 | 1.82 | 1.91 |

Test Method Description: The EPDM and TPV examples described above were subjected to immerse in concentrated detergent liquid (4 pods per 1 liter) at 60° C. for 3 days. The TPV grades examples lower weight gain and lower change in hardness (Shore A). This shows that seal performance would be more consistent compare to EPDM.

TABLE 2

Water and detergent exposure results of gaskets (60° C., 72 hrs.)

| Test Sample | Weight Gain (%) | Hardness Change (Shore A) |
| --- | --- | --- |
| EPDM | 8.6 | 8.1 |
| TPV1 | 5.6 | 2.3 |
| TPV2 | 3 | 2.9 |
| TPV3 | 4.5 | 4.5 |

The relatively low water gain and hardness change for the TPV's when exposed to water and detergent, as well as their low coefficient of friction (COF), make TPV's ideally suited for gaskets. Further, using the low cost method of extrusion molding allows for multiple different annular zones of hardness to improve the overall performance of the gasket, more easily implemented with such a process as compared to injection molding.

As used herein, the phrase "consisting essentially of" for a composition or article of matter means that there may be up to 1, or 2, or 3, or 4 wt %, by weight of the polypropylene, of additives such as antioxidants, slip agents, cross-linking agents, peroxide agents, alkyl radical scavengers, acid neutralizers, nucleating agents, fillers, colorants, polymeric compatibilizers (elastomers, plastomers, LDPE, etc.), hydrocarbon resins, and/or other such additives as are known in the art. Likewise, as it relates to a process claim, "consisting essentially of" does not exclude minor procedures such as crystallization, solvent addition or removal, heating/cooling, and exchanging or addition of gases, fluids and/or solids that are not essential and are otherwise non-reactive with the claimed components.

The present invention offers many advantages over prior gaskets and methods of making gaskets. The present invention allows the use of multiple materials and thus allows higher modulus materials to be used at attachment points which potentially eliminates metallic fasteners. Further, the current invention allows lower modulus materials to be used in critical sealing areas and areas requiring low force and vibration transmission. Further, lubricated materials can be used where high abrasion resistance is needed.

All publications, patents and patent applications mentioned herein are herein incorporated by reference to the same extent as if each individual publication patent, or patent application was specifically and individually indicated to be incorporated by reference.

The gasket thus described, it will be apparent that its descriptive elements and ranges may be varied in many ways and that such variations are not to be regarded as a departure from the scope of the invention; and that all such modifications apparent to one skilled in the art in light of this Specification are intended to be included within the scope of the following claims.

The invention claimed is:

1. A multi-hardness co-extrusion molded gasket comprising:
one or more annular sections configured to engage a door rim of a tub, one or more annular sections configured to engage the tub, and one or more sealing sections disposed therebetween,
wherein the gasket comprises at least one thermoplastic vulcanizate comprising at least 15 wt %, by weight of the thermoplastic vulcanizate, of a cross-linkable ethylene-based elastomer and within a range from 5 to 30 wt %, by weight of the thermoplastic vulcanizate, of at least one thermoplastic, the thermoplastic vulcanizate having a first Shore Hardness within a range from 35 A to 50 D and a coefficient of friction within a range from 1.5 to 2.2,
wherein the thermoplastic vulcanizate and at least one additional thermoplastic vulcanizate having a second Shore Hardness are co-extrusion molded into the multi-hardness gasket.

2. The gasket of claim 1, wherein styrenic copolymers are absent from the gasket.

3. The gasket of claim 1, wherein the thermoplastic vulcanizate further comprises a non-migratory polysiloxane.

4. The gasket of claim 1, wherein the at least one thermoplastic vulcanizate further comprises within a range from 10 wt % to 60 wt %, by weight of the thermoplastic vulcanizate, of an oil.

5. The gasket of claim 4, wherein the at least one thermoplastic vulcanizate consists essentially of the cross-linkable ethylene-based elastomer, thermoplastic, oil, resin, clay, carbon black, a non-migratory silicon-slip agent, and curatives.

6. The gasket of claim 1, wherein the gasket forms a water-tight seal between an appliance tub containing water and a door rim that sealingly fits against the appliance tub, the gasket forming a seal between the appliance tub and door rim.

7. The gasket of claim 1, wherein the at least one thermoplastic vulcanizate has a 100% Modulus of at least 1 MPa.

8. The gasket of claim 1, wherein the at least one thermoplastic vulcanizate has a coefficient of friction within a range from 1.5 to 2.0.

9. The gasket of claim 1, wherein the at least one thermoplastic vulcanizate and at least one additional thermoplastic vulcanizate are co-extrusion molded to form a continuous gasket profile that is multi-hardness in profile.

10. The gasket of claim 1, wherein extrusion molded gasket is extruded into an annular shape, and wherein the ends are fused to one another to create a continuous annular gasket.

11. A method of making a multi-hardness gasket comprising:
    extrusion molding at least one thermoplastic vulcanizate into an annular form having one or more annular sections configured to engage a door rim of a tub, one or more annular sections configured to engage the tub, and one or more sealing sections disposed therebetween,
    cutting the annular form to a desired length such that the annular form has two ends, and
    fusing one end of the annular form to other end to create a continuous annular gasket,
    wherein the at least one thermoplastic vulcanizate comprises at least 15 wt %, by weight of the thermoplastic vulcanizate, of a cross-linkable ethylene-based elastomer and within a range from 5 to 30 wt %, by weight of the thermoplastic vulcanizate, of at least one thermoplastic, the thermoplastic vulcanizate having a Shore Hardness within a range from 35 A to 50 D and a coefficient of friction within a range from 1.82 to 2.2,
    wherein the at least one thermoplastic vulcanizate and at least one additional thermoplastic vulcanizate are co-extrusion molded to form a continuous gasket profile that is multi-hardness in profile.

12. The method of claim 11, wherein styrenic copolymers are absent from the gasket.

13. The method of claim 11, wherein the thermoplastic vulcanizate further comprises a non-migratory polysiloxane.

14. The method of claim 11, wherein the at least one thermoplastic vulcanizate further comprises within a range from 10 wt % to 60 wt %, by weight of the thermoplastic vulcanizate, of an oil.

15. The method of claim 14, wherein the at least one thermoplastic vulcanizate consists essentially of the cross-linkable ethylene-based elastomer, thermoplastic, oil, resin, clay, carbon black, a non-migratory silicon-slip agent, and curatives.

16. The method of claim 11, wherein the gasket forms a water-tight seal between an appliance tub containing water and a door rim that sealingly fits against the appliance tub, the gasket forming a seal between the appliance tub and door rim.

17. The method of claim 11, wherein the at least one thermoplastic vulcanizate has a 100% Modulus of at least 1 MPa.

18. The method of claim 11, wherein the at least one thermoplastic vulcanizate has a coefficient of friction within a range from 1.5 to 2.0.

19. The method of claim 11, wherein the at least one thermoplastic vulcanizate and at least one additional thermoplastic vulcanizate are co-extrusion molded to form a continuous gasket profile that is multi-hardness in profile.

20. A multi-hardness co-extrusion molded gasket comprising:
    one or more annular sections configured to engage a door rim of a tub, one or more annular sections configured to engage the tub, and one or more sealing sections disposed therebetween,
    wherein the gasket comprises at least one thermoplastic vulcanizate comprising at least 15 wt %, by weight of the thermoplastic vulcanizate, of a cross-linkable ethylene-based elastomer and within a range from 5 to 30 wt %, by weight of the thermoplastic vulcanizate, of at least one thermoplastic, the thermoplastic vulcanizate having a Shore Hardness within a range from 35 A to 50 D and a coefficient of friction within a range from 1.82 to 2.2,
    wherein the at least one thermoplastic vulcanizate and at least one additional thermoplastic vulcanizate are co-extrusion molded to form a continuous gasket profile that is multi-hardness in profile,
    wherein the at least one thermoplastic vulcanizate has a first Shore Hardness and the at least one additional thermoplastic vulcanizate has a second Shore Hardness, wherein the at least one thermoplastic vulcanizate or the at least one additional thermoplastic vulcanizate has a greater Shore Hardness, and the one or more annular sections configured to engage the tub comprises the at least one thermoplastic vulcanizate or the at least one additional thermoplastic vulcanizate having the greater Shore Hardness, wherein the greater Shore Hardness is from 45 D to 50 D.

* * * * *